Dec. 19, 1933.  J. A. OLSON  1,939,788
IMPROVED MECHANICAL CYLINDER
Filed May 27, 1930  2 Sheets-Sheet 1
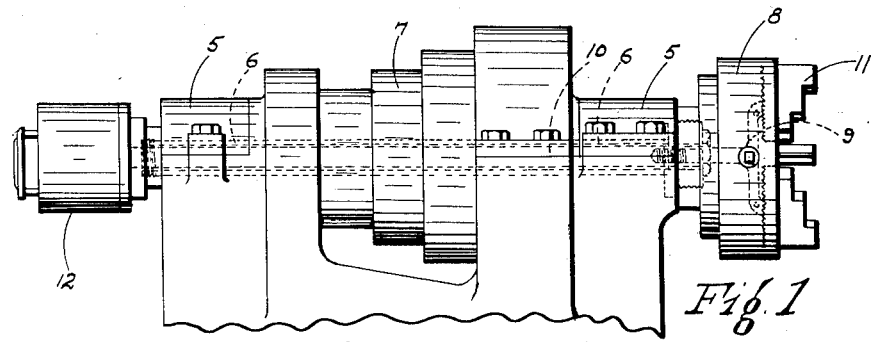
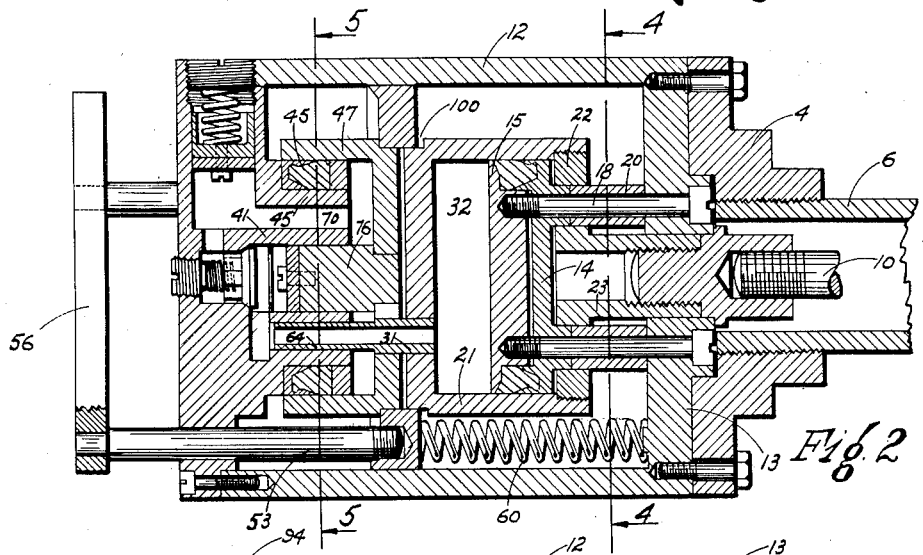
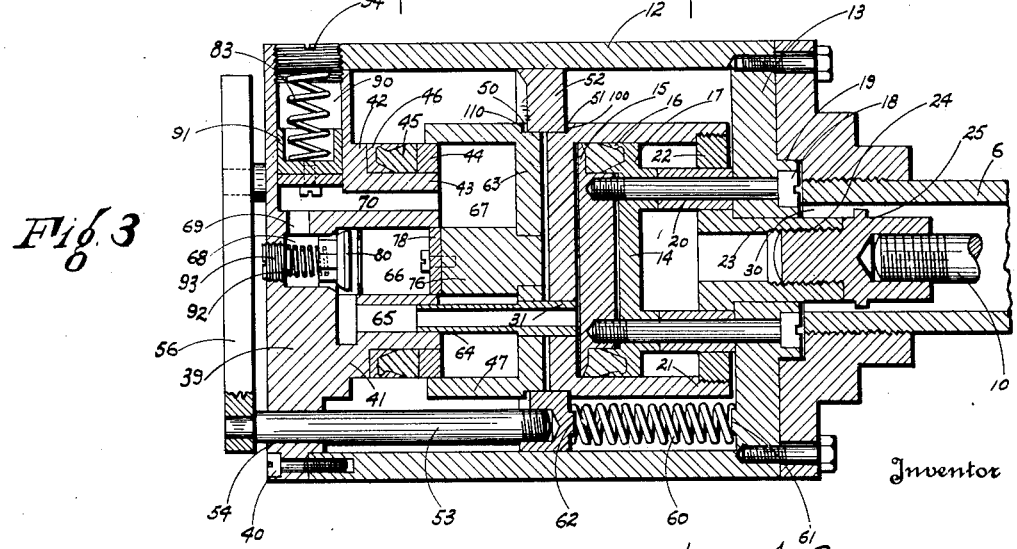
Inventor
JOHN A. OLSON.
By Richey & Watts
Attorneys

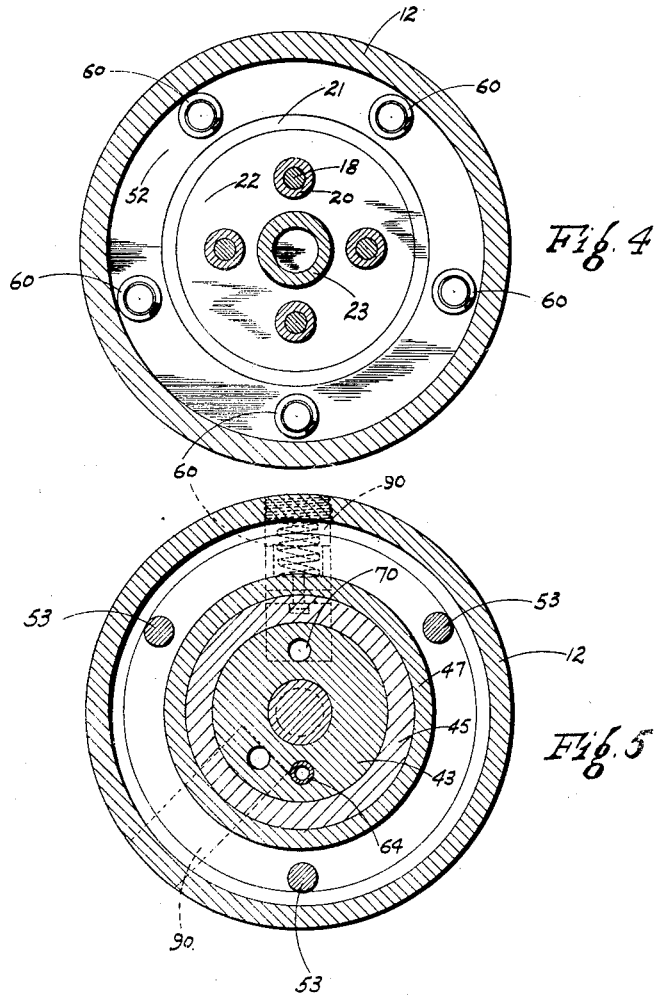

Patented Dec. 19, 1933

1,939,788

UNITED STATES PATENT OFFICE 1,939,788

IMPROVED MECHANICAL CYLINDER

John A. Olson, Cleveland, Ohio, assignor to Ruth M. Olson, Cleveland, Ohio

Application May 27, 1930. Serial No. 456,075

7 Claims. (Cl. 60—54.5)

This invention relates broadly to an organization of hydrostatic instrumentalities utilized to transmit reciprocal movements, and more particularly relates to improved mechanical cylinder for actuating the draw rods of chucks such as are used on lathes and multiple spindle machines.

In providing devices for actuating draw rods or similar elements of chucks on various machines, an air or a hydraulically operated mechanism is usually supplied. Certain inherent mechanical disadvantages usually reside in the more common mechanisms, among which may be enumerated: the provision of storage reservoirs for the fluid pressure; and the means for maintaining the fluid under pressure. A great loss of efficiency is often entailed due to leakages concurrent with the plurality of conduits necessary; further disadvantages reside in the necessary provision of complicated machines, such as pumps and the parts ancillary thereto, to maintain a sufficient operating pressure to actuate the devices.

Further, the mechanically operated draw-rods are capable of but short longitudinal travel, which is still further reduced by the leverage which usually exists between the draw-rod and the jaws of the chuck, particularly in chucks of the bell-crank actuated jaw type.

It is therefore among the objects of this invention to overcome the disadvantages of the various types of chucks and to provide a chuck operating mechanism that is not complicated yet one that is positive in its operation.

Another object of the invention is to provide a draw-rod actuating mechanism which will operate the jaws of the chuck to more securely grip the articles placed in the chuck and which will allow for considerable discrepancy in the sizes of the various objects to be handled by the chuck.

Still another object of the invention is to provide a hydrostatic draw-rod actuating mechanism which is compact and substantially self-contained, utilizing common hydrostatic principles to transmit a large gripping power to the chuck jaws.

Other objects of the invention and the invention itself will become more clearly apparent from a reference to the following description of an embodiment thereof, in which description reference may be had to the accompanying drawings illustrating an embodiment of the invention.

In the drawings:

Fig. 1 is an elevation of a lathe head showing the draw-rod actuating mechanism mounted thereon and showing in dotted lines certain other hidden parts of the lathe which are ancillary thereto;

Fig. 2 is a vertical medial sectional view of the draw-rod actuating mechanism;

Fig. 3 is a view similar to Fig. 2 of the mechanism in another position;

Figs. 4 and 5 are sectional views taken along the lines 4—4 and 5—5 of Fig. 2 and looking in the direction of the arrows.

Referring now particularly to the drawings throughout which like parts are designated by like reference characters, the lathe head comprises the usual journal boxes 5 in which a driving hollow shaft 6 is journaled upon suitable bearings. A pulley 7 is disposed on the shaft to rotate the same and a chuck 8 is carried and driven by the end of the shaft at the right as viewed in Fig. 1. A chuck draw-rod operating mechanism is shown in position on the other end of the shaft 6 being supported on the shaft by a coupling 4. The draw-rod 10 extends from the chuck operating mechanism into the chuck 8 where it actuates bell-crank levers 9 in co-operation with the chuck jaws 11.

The draw-rod operating mechanism is disposed in a cylindrical housing 12 which may have an integral end wall 13. A fluid responsive member is provided to actuate the draw-rod and comprises a piston 14 which has a compression head 15, packing 16, and expansible body 17. The packing for the piston may be of the type more fully described in my Patent No. 1,754,764 of April 15, 1930. The piston is supported by the end wall 13, being secured thereto by means of studs or screws 18. The studs 18 extend through a circular boss 19 on the outside of the housing end wall, and the piston is spaced from the end wall by bushings 20 through which the studs 18 extend.

A cylinder 21 is adapted to reciprocate longitudinally along the piston, the inner wall of the cylinder being in fluid tight engagement with the piston. A perforated end wall 22 is screwed into the skirt of the cylinder adjacent the free edge thereof and is adapted to act as a cross-head and supports an integral stem 23. The stem 23 has a threaded bore 24 into which a coupling 25 may be screwed to couple the cylinder 21 to the draw-rod 10. The cylinder is adapted to be reciprocated upon the piston by fluid pressure and the stem 23, which extends through a central aperture 30 in the housing end wall, actuates the draw-rod 10 longitudinally. A tubular fluid outlet and inlet duct 31 is provided and communicates with the chamber 32 formed by the piston 14 and cylinder 21.

The opposite end of the housing 12 is closed by a member 39, which is secured to the housing by screws 40. A fluid pressure means is provided for actuating the pressure responsive means previously described. The inner face of the member 39 supports a piston 41, which comprises a centrally disposed cylindrical boss 42 having a reduced end 43 which provides a seat for a suitable sealing means comprising a compression ring 44, packing 45 and expansion ring 46 substantially the same as on the piston 14. A cylinder 47 is disposed about the piston 41 the inner walls of the cylinder being in fluid-tight engagement with the sealing ring of the piston 41.

Each of the cylinders 47 and 21 are provided with annular reduced portions 50 and 51 at their adjacent ends about which is disposed an annulus 52. The annulus is of sufficient diameter to provide a running fit with the inner walls of the housing 12, and is adapted to be reciprocated longitudinally by a plurality of pins or rods 53 which extend through apertures 54 in the end member 39, the ends of the pins being secured to an operating handle 56. The annulus is spring-pressed to the left as viewed in the figures, by a plurality of springs 60 which are interposed between the annulus and the end wall 13, slight projections or bosses 61 and 62 being provided on the end wall and annulus respectively to maintain the springs in proper alignment.

The fluid duct 31, which comprises a tube secured in the head of the cylinder 21, extends slidably through the end wall 63 of the cylinder 47. The end portion 64 of the tube may be smaller and is adapted to reciprocate in a duct 65 in the body of the piston 41. Another fluid pressure means is provided and consists of a relatively small cylinder 66 which is a longitudinal bore disposed in the piston portion 41 with the inner end of the cylinder in communication with the duct 65; it is also in communication with the chamber 67 formed by the piston 41 and cylinder 47 by ducts 68, 69 and 70. A piston 76, which is supported by the end wall 63, of the cylinder 47 is adapted to be reciprocated in the cylinder 66, being provided with a suitable packing or sealing means 78.

A valve 80 is disposed at the end of the cylinder 66 and is adapted to close the duct 68 and is adapted to be urged to a normally open position by a helical spring 92 supported by a screw threaded plug 93 disposed in a threaded aperture in the end wall of the member 39.

A pair of fluid reservoirs are also provided in the member 39, and communicate with the chamber 67 through the ducts 70. The reservoirs are substantially the same and each comprises a cylindrical bore 90 disposed radially in the member 39 in which a spring-pressed cup-shaped piston 91 is disposed. The piston is spring-pressed to cause the fluid to flow toward the chamber 67, by helical springs 83 which bear against an adjusting plug 94 screw-threaded in the end of the cylinder 90 which opens through the exterior of the housing.

In operation, the chambers 67, 32, 66 and all of the ducts in communication therewith, are normally filled with a relatively non-compressible fluid, such as water, oil, glycerine or the like.

In Fig. 2 the device is shown in a position wherein the draw-rod has been retracted to close the jaws of the chuck gripping an article securely. The operation about to be described, will be that, wherein pressure is brought to bear on the operating handle 56 to release or extend the draw-rod and release the article gripped by the jaws of the chuck.

When pressure is exerted upon the operating handle 56, to reciprocate the same to the right as viewed in Fig. 2, which may be accomplished by suitable levers, not shown, or manually; the annulus 52 is reciprocated axially to the right against the pressure of the springs 60 by the rods 53. The inner edge of the annulus contacts with the shoulder 100 formed by the annular reduced portion 51 on the end the cylinder 21 to move the cylinder with it toward the housing end wall 13.

Reciprocation of the cylinder 21 to the right causes the volume of fluid in the chamber 32 to be reduced, the piston 14 being rigidly held by the end wall 13 and forces the fluid out of the chamber 32 through the ducts 31 and 65 into the cylinder 66 past the valve 80 through ducts 68, 69 and 70 into the chamber 67, the valve 80 having previously opened as hereinafter more fully described. The flow of fluid into the chamber 67 causes the cylinder 47 to be reciprocated longitudinally to the right with the cylinder 21. It may now be considered that the jaws of the chuck are open and the article which has been worked upon may be removed and replaced with another upon which it is desired to operate.

When an article to be worked upon is placed in the chuck and it is desired to grip the same, the pressure on the handle 56 is merely released, which causes the chuck to securely grip the article. Upon release of the handle, the springs 60 reciprocate the annulus 52 axially within the housing to the left as viewed in the figures. Reciprocation of the annulus to the left within the housing causes the inner edge of the annulus to abut the shoulder 110 formed by the annular reduced end 50 of the cylinder 47, forcing the cylinder to the left together with the annulus. The chamber 67 within the cylinder 47 being reduced volumetrically due to the telescopic action of the cylinder 47 upon the piston portion of the member 41, forces the fluid from the chamber 67 as well as chamber 66 through the ducts 70, 69, 68, past the valve 80 through the ducts 65 and 31 into the chamber 32, which causes the cylinder 21 to be reciprocated longitudinally to the left, carrying with it the cross head 22 and the attached draw-rod 10.

As soon as the draw-rod meets with resistance, due to the jaws of the chuck gripping the article placed in the chuck, the large chamber 67 is thrown out of communication with the chamber 32 and the small chamber 66 only, remains in communication therewith.

It may be readily seen that as long as the movement of cylinders are toward the left and there is no restraint upon the chuck jaws, that the pressure to the left of the valve 80 will be slightly greater than the pressure upon the right side of the valve, which condition together with the spring 92 maintains the valve in an open position. As soon as the chuck jaws meet with restraint and grip the article which is placed therein, the movement of the cylinder 21 will substantially cease and a pressure will be set up in the fluid because it can no longer flow into the chamber 32. Fluid flow past the valve 80 from left to right will then cease. However the pressure of the springs 60 is still maintained upon the cylinder 47. The fluid will then start to enter the reservoirs 90 allowing the cylinder 47 to continue its leftward travel together with the small piston 78 in the small cylinder 66. The flow from the small cylinder causes the pressure on the right side of the valve 80 to be greater than on the left and the valve then closes. Upon the closure of the valve, which is substantially simultaneous with the gripping of the chuck jaws, the fluid from the cylinder 67 will continue to enter the storage reservoir cylinders allowing the springs to urge the cylinder still further toward the left. The small piston 76 which is chambered in the cylinder within the larger piston 41, being of reduced cross-section, will therefore increase the pressure within the chamber 32, that is, if there should be five of the springs 60 capable of 100 lbs. pressure each, there will be the amount of pressure exerted by the springs upon the surface of the small piston, which in this instance is approximately 500 lbs., less the pressure necessary to overcome the springs within the storage reservoirs, to be exerted by the small cylinder upon the fluid therein which pressure is transmitted to the fluid in the large chamber 32, thus creating a substantial increase in pressure over that which was primarily produced by the reciprocation of the cylinder 47 to the left when the valve was open. The resultant pressure is dependent upon the relation between the cross-sectional area of the small piston and cylinders 66 and 76 and the large piston and cylinders 14 and 21. This results in an ultimate gripping pressure of the chuck jaws 11 which is many times the force of the springs 60.

When it is desired to release the article from the chuck, pressure upon the operating handle, releases pressure within the chambers 66 and 32 and the reservoir pistons will force fluid through the ducts 70, 69 and 68 which together with the spring 92 will open the valve 80, the spring then holds the valve open allowing the fluid to escape through the ducts from the chamber 32 into the cylinder 67 as previously described.

It may thus be seen that a mechanism has been provided whereby the draw-rod, which operates chuck jaws, is capable of a relatively long longitudinal movement. It will also appear clearly to those familiar with chucking mechanisms, that the point where a considerable amount of gripping power is to be exerted by the chuck jaws, is when the chuck jaws contact with the article which it is desired to grip. At all other times the power required to move the parts is relatively small.

By closing the communication between the large cylinders and maintaining the communication between the small cylinder and the large cylinder wherein the ratio is different, that is, the cross-sectional area of the small cylinder is smaller than that of the large cylinder, a very distinct hydraulic advantage is obtained and considerable pressure is brought into operation by the chuck jaws.

Although there have been but two pressure reservoirs provided in the member 39, it will readily appear that one might suffice for the operation of the invention or that there might be a plurality in place of the two shown.

It also remains but a mechanical proposition to reverse the order of the parts and to provide movable pistons where there are now shown movable cylinders. The result however, in either case will be substantially the same. It will also be quite apparent, that such a mechanism is not necessarily limited to the actuation of draw-rods of lathe chucks as the same mechanism might be very successfully used to actuate rods for other purposes, for instance, such a mechanism might be used to operate the brake rods upon an automobile.

The number and size of the springs 60 is entirely dependent upon the place where the mechanism is to be used as also are the other proportions used throughout the mechanism.

Having thus described my invention I am aware that numerous and extensive departures may be made from that shown throughout the drawings, but that such departures cannot be made without falling within the scope and spirit of this invention.

I claim:

1. In a hydrostatic transmission mechanism, a cylindrical housing, end walls for the housing, pistons rigidly supported by each end wall, cylinders reciprocably disposed about each piston, a draw-rod connected to one cylinder, means disposed about the adjacent ends of the cylinders to alternately reciprocate the cylinders, an expansible chamber defined by the piston and cylinder associated with the draw-rod, a second expansible chamber defined by the other piston and cylinder, a fluid duct connecting said chambers, a relatively small cylinder disposed within one of the pistons and a piston carried by one of the cylinders reciprocable in the small cylinder, said piston and cylinder defining a third relatively small expansible chamber, said fluid duct communicating with said small chamber, fluid controlled valve means to close the communication between the larger chambers and allow communication only between the smaller and one large chamber whereby an application of pressure in the smaller chamber will be transmitted to the larger chamber with the resultant increase in pressure.

2. In a hydrostatic transmission mechanism for operating draw rods, a cylindrical housing having end walls, a pair of pistons supported by said end walls and projecting inwardly of said housing, a pair of cylinders surrounding said piston and reciprocable thereon, a fluid duct connecting said cylinders, a cross head supported by one of said cylinders, a draw rod, means for connecting said cross head to said draw rod, means for moving said last named cylinder whereby fluid is compressed in the chamber of said cylinder and flows through said duct into the other cylinder and moves the same, a third piston and cylinder having open communication with the fluid duct connecting the first two cylinders, means for moving the piston of said third cylinder to move fluid into one of the larger cylinders, and a valve in said fluid duct between said large cylinders to close communication between said third piston and one of said first named pistons and to maintain communication between the third piston and the other of the first named cylinders.

3. In a hydrostatic transmission mechanism for operating draw rods, a cylindrical housing having end walls, a pair of pistons supported by the end walls of the housing and extending inwardly of the housing, a pair of cylinders encompassing said pistons and reciprocable thereon, a fluid duct connected with each of said cylinders, a cross head supported by one cylinder, a draw rod projecting through one of the end walls of the housing, means for connecting said draw rod to said cylinder, a handle having a part projecting through the other end wall, instrumentalities for connecting said operating handle to at least one of said cylinders whereby force may be applied to one of said cylinders to move the same and cause fluid to be expelled from said cylinder and to be transmitted through said duct to the interior of said other cylinder to expand the other cylinder, a third piston and cylinder of relatively small capacity, means for establishing open communication with the main fluid duct between the large cylinders, means for moving said third piston to force fluid through the main duct into one of the larger cylinders, and a valve in the main duct operable to close communication between the large pistons and between one of the large pistons and the third piston, and a reservoir for receiving excess fluid from the large cylinder to shut off communication with the small cylinder and the other cylinder.

4. In a hydrostatic transmission mechanism for actuating draw rods and the like, a cylindrical housing having end walls, pistons carried by the end walls of said housing and projecting into the interior thereof, a pair of cylinders encompassing said pistons and reciprocable with relation thereto, the interior of said cylinders forming fluid chambers of approximately the same area, a fluid duct connecting said two cylinders, a valve in said fluid duct, a reservoir, a duct connecting said reservoir with one of said cylinders, a third piston and cylinder having a small displacement area, means for establishing open communication between said cylinder and the main duct between said two first named cylinders, means for moving one of the first named cylinders to expel the fluid therefrom and force the same into the other large cylinder, means for moving said third piston to force fluid from the chamber of said third piston and into the main duct between said two large cylinders, the pressure exerted by said small piston acting to close said valve means in said main duct between said large pistons, said means for moving said small piston being effective to move one of said larger pistons and to force fluid into said reservoir.

5. A hydrostatic device for actuating a draw rod which consists in the combination of a cylindrical housing, end walls for the housing, pistons rigidly supported by each end wall, cylinders respectively disposed about each piston, a draw rod connected to one cylinder and adapted to be moved thereby when said cylinder is moved, means disposed about the adjacent ends of the cylinders to alternately apply force to said cylinders to effect the reciprocation thereof, an expansible chamber defined by the piston and cylinder associated with the draw rod, a second expansible chamber defined by the other piston and chamber, a fluid duct connecting said chambers, a relatively small cylinder disposed within one of said pistons, and a piston carried by one of the cylinders reciprocable in said small cylinder, said last named large piston and small piston adapted to operate as a fluid pump having a pressure area effective for displacing fluid, the other of said pistons and piston chamber arranged to receive the fluid from said pump and to act as a fluid motor effective to move said draw bar, and means for automatically changing the effective size of one of the pressure areas of said pump upon the application of a predetermined resistance to movement of said draw bar.

6. In a hydrostatic transmission mechanism, a cylindrical housing having end walls, pistons rigidly mounted on each end wall, cylinders encompassing said pistons and reciprocable with relation thereto, a draw rod connected to one of said cylinders, a ring encompassing said cylinders, manual means for moving said ring in one direction to move at least one of said cylinders, resilient means engaging said ring for moving at least one of said cylinders in the opposite direction, and means for moving one of said pistons in response to movement of the other of said pistons comprising a fluid duct communicating with said cylinders, said fluid duct and said cylinders being adapted to be filled with a fluid, a small piston carried by one of said cylinders, a small cylinder for said piston mounted in said housing, said cylinder having open communication with the duct between said large cylinders, and a fluid control valve in said main duct operable upon actuation of said small cylinder to close communication between the two large cylinders and between one of the large cylinders and the small cylinder whereby the force exerted by said small cylinder when transmitted through said fluid will actuate one of said larger pistons.

7. In a hydrostatic transmission mechanism, a housing, pistons supported by the housing, cylinders for the pistons, a draw rod connected to one cylinder, means to alternately reciprocate the cylinders, said pistons and cylinders forming expansible chambers, a conduit to provide fluid communication therebetween, one of said chambers having a relatively small cylinder and piston disposed therein and expansible therewith to define a third expansible chamber of small capacity, said conduit communicating therewith, fluid controlled valve means to close communication between the large chambers and permit only the small chamber to communicate with the large chamber whereby pressure from the small chamber to the large chamber permits increased pressure to be applied to the large chamber.

JOHN A. OLSON.